HIGH SPEED BINARY-TO-DECIMAL CONVERSION SYSTEM

Filed April 1, 1964

INVENTORS
STANLEY W. SCHORUM
JAY R. WOLFF
BY Robert L. Slater, Jr.
ATTORNEY

United States Patent Office 3,474,441
Patented Oct. 21, 1969

3,474,441

HIGH SPEED BINARY-TO-DECIMAL CONVERSION SYSTEM

Stanley W. Schorum, Park Ridge, and Jay R. Wolff, Highland Park, Ill., assignors, by mesne assignments, to the United States of America as represented by the Administrator of the National Aeronautics and Space Administration Filed Apr. 1, 1964, Ser. No. 356,488
Int. Cl. H03k 13/24
U.S. Cl. 340—347 4 Claims

ABSTRACT OF THE DISCLOSURE

A high speed binary-to-decimal conversion system includes a binary register divided into a plurality of subgroup registers, each storing a preselected portion of the binary number and including a preselected one of the binary digits as a least significant binary digit in the respective subgroup register; a binary to decimal converter connected to each of said subgroup of registers; and a decimal register coupled to receive the outputs from the binary to decimal converter. The binary to decimal converter cooperates with each of the plurality of the subgroup registers in a predetermined sequence and on the basis of the decimal number equivalent of the least significant binary digit in the respective subgroup register. More particularly, each subgroup register, through the operation of the binary to decimal converter, provides a decimal number to the decimal register equal to the binary number stored therein on the basis of the decimal number equivalent of the least significant binary digit of the particular subgroup register cooperating with the binary to decimal converter. In this manner, the binary to decimal converter functions such that it provides to the decimal register not only outputs representing units, but also outputs reresenting higher order decimal numbers, thereby achieveing the conversion from binary to decimal number in fewer steps than previous conversion systems.

Figures 1, 2:
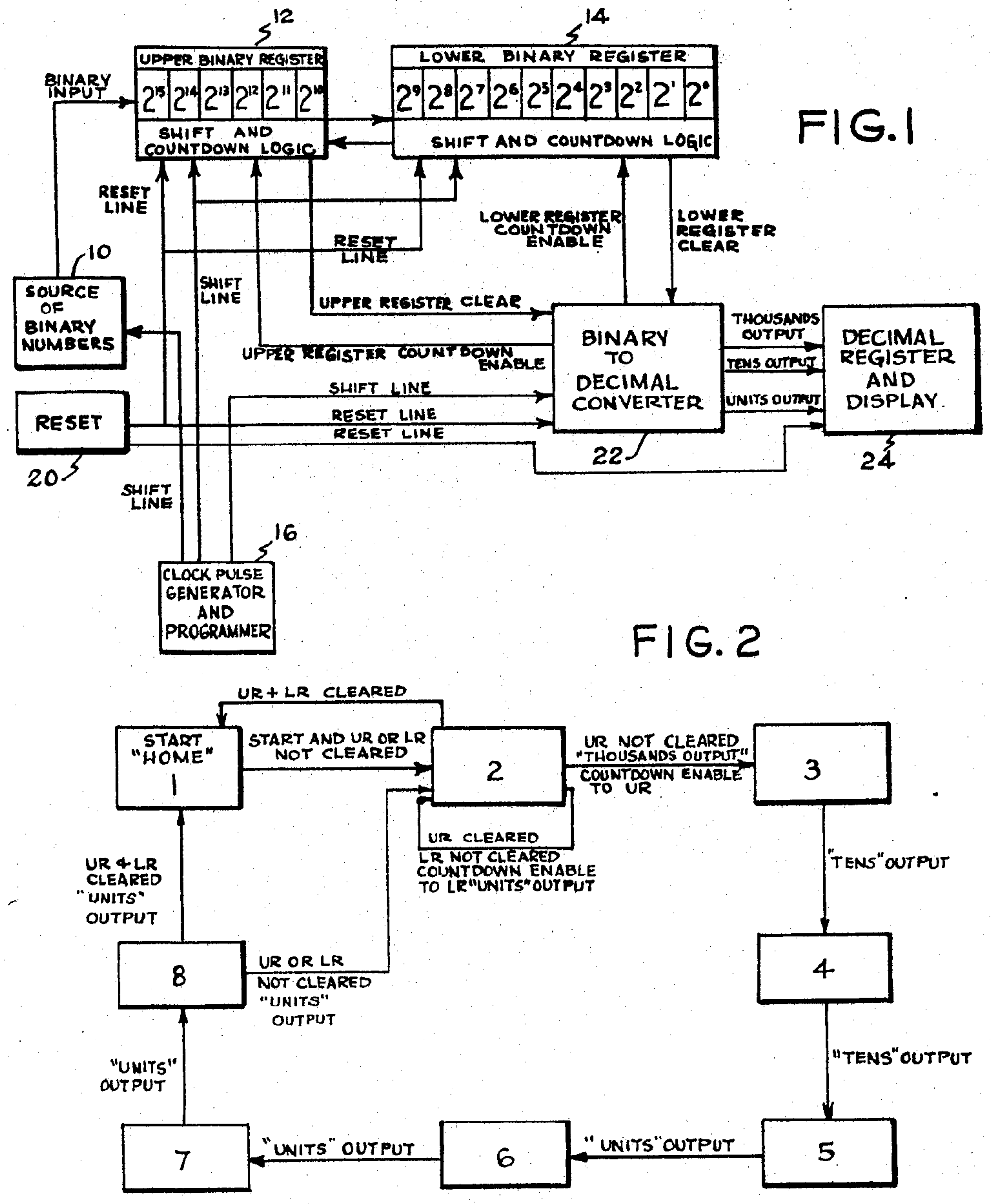

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates generally to systems for converting a binary number to the decimal equivalent or decimal counterpart thereof, and more particularly to a system for rapidly converting electrical pulses corresponding to a number in binary notation to electrical pulses representative of the same number in decimal notation.

In data handling, evaluating and processing equipment, such as high speed counters, scalers, and digital computers, it is convenient to process electrical pulses, corresponding to the numerical data which are to be processed, in the binary system of notation. That it to say, all numbers are converted to the base or radix 2 for subsequent operations usually by means of cascaded bistable switching devices or flip-flops. A flip-flop is a bistable circuit device capable of assuming either of two stable electrical conditions or states in an alternate manner in response to an input or trigger signal. Flip-flop circuits may be designed utilizing vacuum tubes, transistor elements, tunnel diodes, and similar switching devices, and since flip-flops are adapted to function most efficiently as binary logic elements typically, computer circuits utilizing flip-flops carry data through the entire processing operation in binary notation. When the data are to be read out of the counter or computer, either by visual display or read out printer, it is desirable for the number to be converted from binary notation into decimal notation for convenience in subsequent interpretation.

Binary based circuits store and process numerical data by means of registers or modified scalers. A typical register may comprise a cascaded series of flip-flops in which the output of each flip-flop becomes the input to the next flip-flop. The storage capacity of the register, or in other words, the number of binary data bits, i.e., basic binary intelligence units, which can be placed in the register, is determined by the total number of cascaded flip-flops. A scaler or register of the aforedescribed type is called a shift register. A binary number may be entered into a shift register in serial form. That is to say, as each bit corresponding to a portion of the binary number enters a flip-flop from the previous flip-flop, each flip-flop in the register takes on the state held by the previous flip-flop until the register is filled. Thus, the register is filled when the last flip-flop in the cascaded series register assumes the state of the next to the last flip-flop of the register.

Typically, in earlier binary to decimal conversion systems, the conversion process transferred numbers stored in the binary shift register into the decimal shift register. The aforesaid conversion process proceeded as follows: Two logically connected registers, which for purposes of illustration will hereinafter be referred to as a binary scaler and a decimal scaler, are simultaneously shifted by means of a synchronizing clock pulse. A binary number is entered into the binary scaler and the decimal scaler is cleared or reset to zero. Each clock pulse then simultaneously subtracts one count from the binary scaler and adds one count to the decimal scaler. Thus, for each count subtracted out of the binary scaler, a corresponding count is entered into the units input of the decimal scaler. When the binary scaler is cleared, or in other words, when all of the data have been subtracted from the binary scaler, the conversion process is complete and the binary number has been wholly transferred to the decimal scaler.

However, when large numbers are encountered, the bit by bit subtraction from the binary scaler into the units input of the decimal scaler is necessarily slow. There are several factors which contribute to the problem of conversion speed. The serial transfer or synchronized subtraction-addition process is effected by means of a clock pulse which advances the transfer of counts from each flip-flop to the next and from the binary register to the decimal register. The frequency of the clock pulse may be limited by the intrinsic time constants of the flip-flop circuits and further limited by the switching speeds of the components themselves. In addition, the ancillary circuits in certain computers may require relatively low clock pulse frequencies, thereby setting an upper limit to switching rates. Furthermore, when a large binary number is encountered, as an example, a 16 bit binary number which can be as large as 65,536 in decimal notation, the conversion time period may be considerable by virtue of the fact that the binary number is entered through the units input of the decimal register. With a clock pulse rate of 100 kilocycles the conversion time for the aforesaid 16 bit binary number would be approximately two-thirds of a second. In order to avoid excessive dead time of the binary shift register during the conversion process, during which time the register cannot accept a new binary number, a more rapid method of converting from the binary register to the decimal register is desirable.

It is, therefore, a primary object of this invention to provide an improved binary to decimal conversion system.

It is another object of this invention to provide a high speed binary to decimal conversion system utilizing improved circuits to greatly increase the rate of conversion with comparatively slow synchronizing clock pulse rates.

It is a further object of this inventiion to provide a high speed binary to decimal conversion system in which the conversion is effected by means of improved shift register transfer circuits.

Still another object of this invention is to provide a high speed binary to decimal conversion system utilizing a parallel gated shift registers wherein large numbers can be entered and stored in a binary register and can be transferred to a decimal register in significantly fewer steps than in previous conversion systems.

For the purposes of illustrating and explaining the novel features of this invention, we have provided in the accompanying drawings preferred embodiments thereof which, when taken into consideration with the following description and claims, should facilitate an understanding of my invention and the operation thereof and wherein, FIGURE 1 is a circuit diagram of a preferred embodiment of this invention;

FIGURE 2 is a flow chart which illustrates the operation of a portion of the circuit shown in FIGURE 1.

The conversion system of the present invention is a modification of the technique whereby the conversion process is a subtraction from the binary number stored in a binary register with simultaneous addition or accumulation of the number in a decimal register. The idea behind this system is that input signals derived from the binary register can be entered directly into decades of the decimal register rather than only through the units input as in previous systems. Thus, utilizing basic circuits which are common and well known, the present invention provides a reduction by a factor of approximately 40 in the required number of operations to convert a binary number equal to $2^{16}-1$ to its decimal counterpart of 65,535.

Referring now to FIGURE 1, which is a circuit diagram of a specific embodiment of the present invention, there is provided a source of binary numbers 10 which is coupled to binary shift registers 12 and 14. Although binary shift registers 12 and 14 have been designated respectively upper binary register and lower binary register for reasons which will become apparent when explained below, in effect, they can be considered functionally as comprising in combination the entire binary shift register. The binary shift register is thus comprised of 16 bistables or flip-flops capable of storing a 16 bit binary number. The binary number is entered into the binary shift register serially at one end of the register.

Connected between the binary shift registers 12 and 14, and the decimal register 24, is a binary to decimal converter register 22. A reset 20 is provided to clear all of the registers to zero when desired. A clock pulse generator and programmer 16 provides a series of electrical gating pulses which are applied simultaneously to the source of binary numbers 10 and to the shift logic circuits of binary shift registers 12 and 14 as well as to the binary to decimal converter 22.

In the preferred embodiment of the invention illustrated in FIGURE 1, the binary number is transferred into the shift registers with its least significant data bit, i.e., binary unit or digit, appearing first and its most significant data bit appearing last. The number is then entered serially in synchronization with the clock pulse signal. As each bit of the binary number is entered, the clock pulse signal is adapted to actuate the appropriate shift line, thus causing the data bit stored in each flip-flop to be shifted to the adjacent flip-flop. The aforedescribed process proceeds from the input end of the register corresponding to the flip-flop designated $2^{15}$, to the opposite end of the register corresponding to the flip-flop designated $2^0$. After 16 shifts the binary number will have been fully entered into the binary shift register, the most significant bit appearing at the left side or input end of the register and the least significant bit appearing at the right side of the register.

The shift register utilized in the preferred embodiment of this invention is a synchronous device utilizing parallel gating. Furthermore, the flip-flop circuits are adapted to perform two operations. The first of these is to shift in the aforedescribed manner when the appropriate signal appears on the shift line and the second is to count down one bit or, in other words, subtract one bit when the appropriate signals appear on the count down enable lines.

To aid in understanding how the shift register operates, the following description of the operation of typical circuits utilized in the invention will be helpful. The binary shift register is comprised of five identical subunits, each consisting of three flip-flops, plus a single flip-flop. Each subunit is adapted to count down one bit in response to a clock pulse whenever a count down enable pulse and carry input pulse are applied simultaneously. The significance of the carry input pulse can best be understood by examining the various input and output signals to and from the subunits. A carry output pulse from the subunit appears whenever the subunit is cleared or contains only zeros. The data output pulse from the subunit represents the output of the flip-flop which carries the least significant bit of the subunit. Thus, two three-stage subunits can be connected in cascade to form a six-stage binary register as follows: First, the carry output of the least significant subunit is connected to the carry input of the most significant subunit. Second, the count down enable leads of both subunits are connected in parallel. Third, the data iput lines of the least significant subunit are connected to the data input lines of the most significant subunit. Thus, the carry output of the most significant subunit becomes the carry output for all six stages of the two cascaded subunits and a carry output signal appears only when both subunits are cleared. A plurality of subunits can be cascaded as aforedescribed to form binary shift registers of any desired capacity and such circuits are wel known to the art and fully described in the technical literature.

In the preferred embodiment of this invention, there have been connected the data inputs and data outputs of five such subunits plus an additional single flip-flop in cascade to form a sixteen stage shift register. However, the carry outputs and carry inputs of the flip-flops have been arranged in such a way as to divide the shift register into two functionally separate and independent registers during the binary to decimal conversion subtraction. These two registers are called the upper binary register 12 and the lower binary register 14, respectively. To illustrate how the binary number appears in the binary shift registers after the 16 stage binary number entry shifting process, the stored binary number can be thought of as two separate binary numbers. The number stored in the upper register 12 has a weight of 1024, i.e. ($2^{10}$) while the number stored in the lower register 14 has a weight of unity. In other words, the original entire binary number can be found by multiplying the binary number stored in the upper register by 1024 and adding the product to the binary number stored in the lower register. The resultant sum is the original binary number as stored in both registers. The significance of this division of the binary shift register into an upper register and a lower register is by no means obvious and will be shown essential to the improved high speed conversion system as described hereinafter.

To illustrate the unique features of the high speed conversion process, a description of a typical conversion follows: It is assumed that a binary number has been entered into the binary register and is sufficiently large so as to occupy both the upper and lower registers. When the count down substraction is started for each count subtracted from the upper register 12, one count is entered to the "thousands" decade of the decimal register 24, two counts are entered to the "tens" decade of the decimal register, and four counts are entered to the "units" decade of the decimal register. Thus, if the upper binary register had contained only one count, equivalent to the decimal number 1024, the number would be entered into the decimal register after seven operations corresponding in turn to seven succesive clock pulses. If, at the end of the aforedescribed process the upper binary register is cleared to zero, the number is in the lower binary register is entered to the decimal register. However, if the upper binary register is not cleared after the first subtraction, which is to say the number stored therein is $2^{11}$ or larger, the aforesaid process is repeated until the upper binary register is cleared to zero. When the upper binary register is cleared, the number stored in the lower binary register is converted to decimal form by entering one count into the decimal "units" decade for each count subtracted from the lower binary register.

The binary to decimal converter 22 in FIGURE 1 performs the above operations by means of three logically connected bistable multivibrators or flip-flops. The three flip-flops and associated logic gates are combined to form a circuit which can assume eight unique stable states, each of which corresponds to various "on" and "off" or "one" and "zero" conditions of each flip-flop. The eight states of the binary to decimal converter 22 are illustrated in the flow chart of FIGURE 2. The binary to decimal converter is similar to a conventional shift register insofar as it is a clocked synchronous register with parallel gating. However, internal gating and logic circuits determine a unique autonomous pattern of operation in states 3, 4, 5, 6, and 7, while states 1, 2, and 8 are made dependent on signals received from the upper and lower binary registers as well as the initial start or reset signal.

The "home" state or state 1 is defined as the starting point or reset position of the binary to decimal converter register or, for purposes of convenience in nomenclature, hereinafter referred to as the BDC. During the shifting operation, i.e., when a binary number is being entered into the upper and lower binary registers, hereinafter referred to as UR and LR respectively, the BDC remains in state 1. After the 16 bit binary number has been fully entered into the UR and LR, the clock pulse generator and programmer 16 enables the BDC to begin the conversion process with a start signal. The start signal causes the BDC to shift to state 2 unless the upper and lower registers are cleared. It is obvious that if both the UR and LR are cleared, the binary number is zero and hence, the BDC will remain in state 1. However, if a number is present in either the UR or LR, the BDC will shift to state 2. If the UR is not cleared when the BDC reaches state 2, the BDC will begin the upper register conversion subtraction.

The upper register conversion subtraction is accomplished by the BDC shifting through six states, generating as well, a specific enable output signal to the UR at the proper state. The first shift from state 2 to state 3 generates a count down enable signal to the upper register and also generates one count on the "thousands" output line to the decimal register. The countdown enable signal to the upper register causes it to perform one subtraction. Thus, 1000 counts, representing a relatively large portion of the decimal number, is transferred in one clock pulse. The second shift from state 3 to state 4 generates one count on the "tens" output line to the decimal register. On the third shift from state 4 to state 5 a one count on the "tens" output line to the decimal register is again generated. The fourth shift from state 5 to state 6 generates a "one" count on the units output line to the decimal register. The fifth shift from state 6 to state 7 and the sixth shift from state 7 to state 8 both generate a "one" count on the units output line to the decimal register.

The BDC can make one of two possible shifts from state 8 depending upon the state of the UR and LR. In either case the move from state 8 to either state 1 (home) or state 2 generates a "one" count on the units output line to the decimal register. It can now be seen that the total number of counts transferred from the UR to the decimal register equals:

$$1000+10+10+1+1+1+1=1024$$

Thus, 1024 counts have been entered into the decimal register on seven successive clock pulses corresponding to the subtraction of one count from the upper binary register.

When the BDC reaches state 8, it examines the contents of the UR and LR. If both the UR and LR are cleared to zero, the BDC will return to state 1 and automatically stop. If, however, the UR is not cleared to zero, the BDC will automatically shift to state 2 and the autonomous cycle described above will be repeated until the UR is cleared. The UR subtraction can be repeated a maximum of 63 times, i.e., $2^6-1$ corresponding to the condition wherein each of the six UR flip-flops contains a "one" at the beginning of the conversion cycle. If the UR is cleared to zero, and the lower register contains a number when the BDC moves from state 1 to state 2, the LR conversion cycle is ready to begin.

During the conversion of the LR, the BDC remains in state 2 and generates a count down enable signal to the LR simultaneously with each clock pulse, which causes the LR to subtract one count on each pulse. For each count subtracted from the lower register the BDC also generates one count on the "units" output line to the decimal register. From the foregoing, it can be seen that the binary number stored in the LR is transferred to the decimal register on a one-to-one basis. When the LR is cleared to zero, the conversion is complete and the BDC returns to state 1 or home where it remains while another binary number is entered into the binary shift register. The maximum capacity of the LR is 1023, i.e., $2^{10}-1$ and thus, the total number of clock pulses required to clear the LR is also 1023, corresponding to the condition wherein each of the flip-flops contains a "one" at the beginning of the conversion cycle.

It can now be seen how large numbers are converted with relatively few successive clock pulses. Assume that the binary register is filled to capacity with a binary number. In the embodiment of my invention illustrated in FIGURE 1, this number corresponds to 65,535, i.e., $2^{16}-1$. The total number of clock pulses necessary to convert this number to decimal form is the sum of the maximum number of clock pulses through which the BDC must cycle in order to clear the upper and lower registers. The maximum numbers of clock pulses for clearing the upper register have been shown to be $63\times7=441$. The maximum number of clock pulses for clearing the lower register has been shown to be 1023. Thus, $441+1023=1464$, and the number 65,535 requires 1464 consecutive clock pulses for complete conversion from binary form to decimal form. If a clock pulse frequency of 100 kilocycles is assumed, the aforesaid number can be converted in approximately 15 milliseconds.

The above specification and drawings are not intended to limit the scope of our invention, but are merely for illustrative purposes. The scope of our invention is set forth below in the following claims.

We claim:

1. Apparatus for converting a binary number into an equivalent decimal number comprising: a binary register for storing a binary number having a predetermined number of binary digits, said binary register being subdivided into a plurality of subgroup registers such that each of said subgroup registers, comprising more than one stage, stores a preselected portion of said binary number and includes a preselected one of said binary digits as a least significant binary digit therein; a decimal register for storing an equivalent decimal number having a number of decimal digits corresponding to said predetermined number of binary digits; and converter means connected to each of said subgroup registers and having outputs coupled to said digital register, said converter means operative to convert in a prearranged sequence the portion of said binary number in each of said subgroup registers into a corresponding portion of said corresponding decimal number in said decimal register on the basis of the decimal number equivalent of said least significant binary digit in said respective subgroup register, thereby reducing the length of the time period required for converting said binary number into an equivalent decimal number.

2. Apparatus as claimed in claim 1, wherein said decimal register includes a plurality of separate decades corresponding to ascending orders of decimal digits; and said converter means includes: means for subtraction counting on a single-count-at-a-time basis from each of said subgroup registers, each count from one of said subgroup registers representing said decimal number equivalent of said least significant binary digit in said subgroup register; and means responsive to each count from one of said subgroup registers to accumulate in said decimal register the decimal number equivalent of said least significant binary digit in said subgroup register by counting into said separate decades of said decimal register the units of magnitude of each corresponding decimal digit of said decimal number equivalent.

3. Apparatus as claimed in claim 2, wherein said predetermined number of binary digits is greater than four, and said binary register is subdivided into an upper subgroup register and a lower subgroup register with said portion of said binary number stored in said upper subgroup register being preselected such that said least significant binary digit therein has a decimal number equivalent which minimizes the total number of counts required to accumulate said equivalent decimal number in said decimal register.

4. Apparatus for converting a binary number which may comprise greater than 10 binary digits into a corresponding decimal number, said apparatus comprising: a binary register for storing said binary number, said binary register including a number of bistable stages equal to the maximum number of binary digits expected in said binary number and being divided into an upper register and a lower register such that the 11th binary digit is the least significant digit in said upper register and the first binary digit is the least significant digit in sad lower register; a decimal register for storing said corresponding decimal number, said decimal register including a plurality of separate decades corresponding to ascending orders of decimal digits in said corresponding decimal number; and means connected to said upper and lower registers for subtraction counting therefrom in sequence, said aforementioned means also including means, coupled to said decimal register, for counting into the thousands, tens, and units decades of said decimal register one, two, and four counts, respectively, for each count from said upper register and for couting into the units decade of said decimal register one count for each count from said lower register.

References Cited

UNITED STATES PATENTS

| | | | |
|---|---|---|---|
| 2,849,704 | 8/1958 | Neff | 340—174 |
| 3,052,411 | 9/1962 | Boese et al. | 235—155 |
| 3,147,472 | 9/1964 | Young | 340—347 |

MAYNARD R. WILBUR, Primary Examiner

W. J. KOPACZ, Assistant Examiner

U.S. Cl. X.R.

235—155